C. F. HUPNER.
CHAFF SEPARATOR.
APPLICATION FILED AUG. 29, 1910.
1,003,138.
Patented Sept. 12, 1911.
3 SHEETS—SHEET 3.
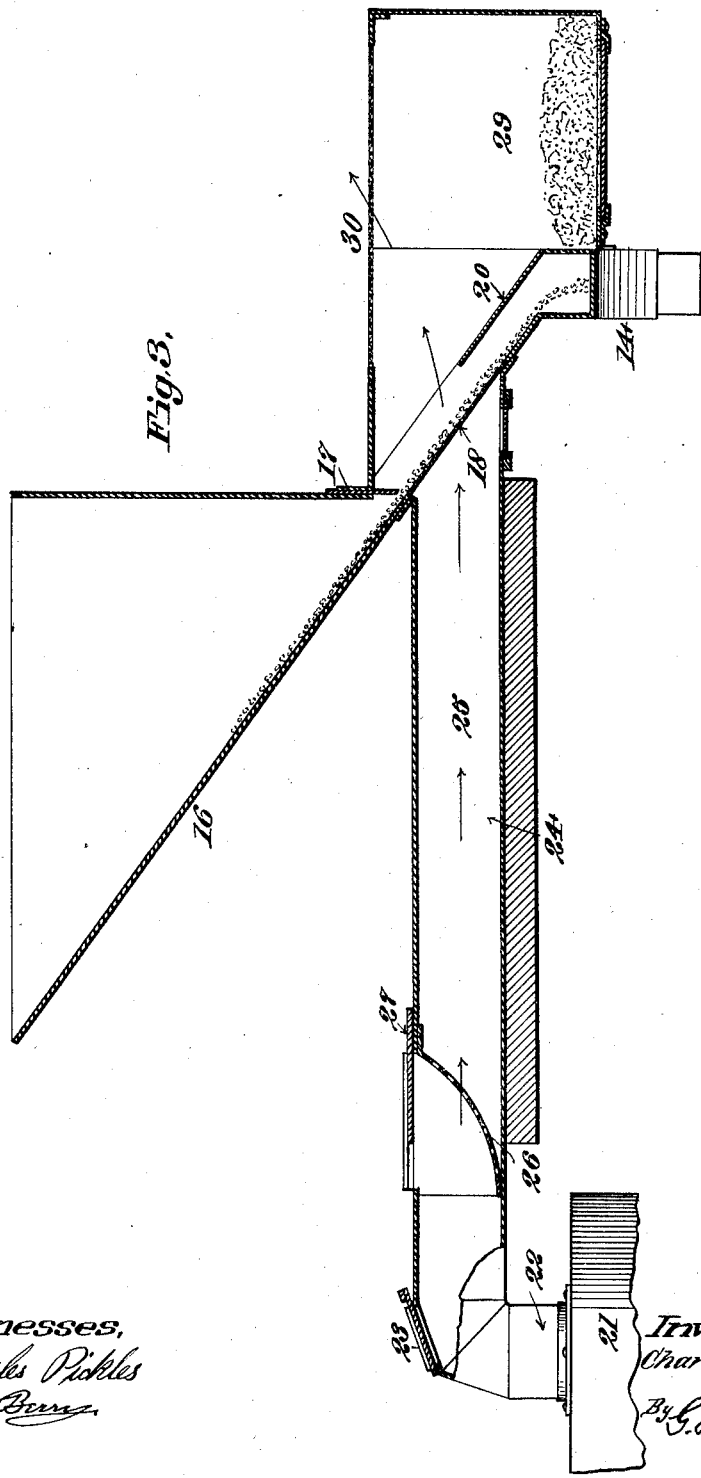

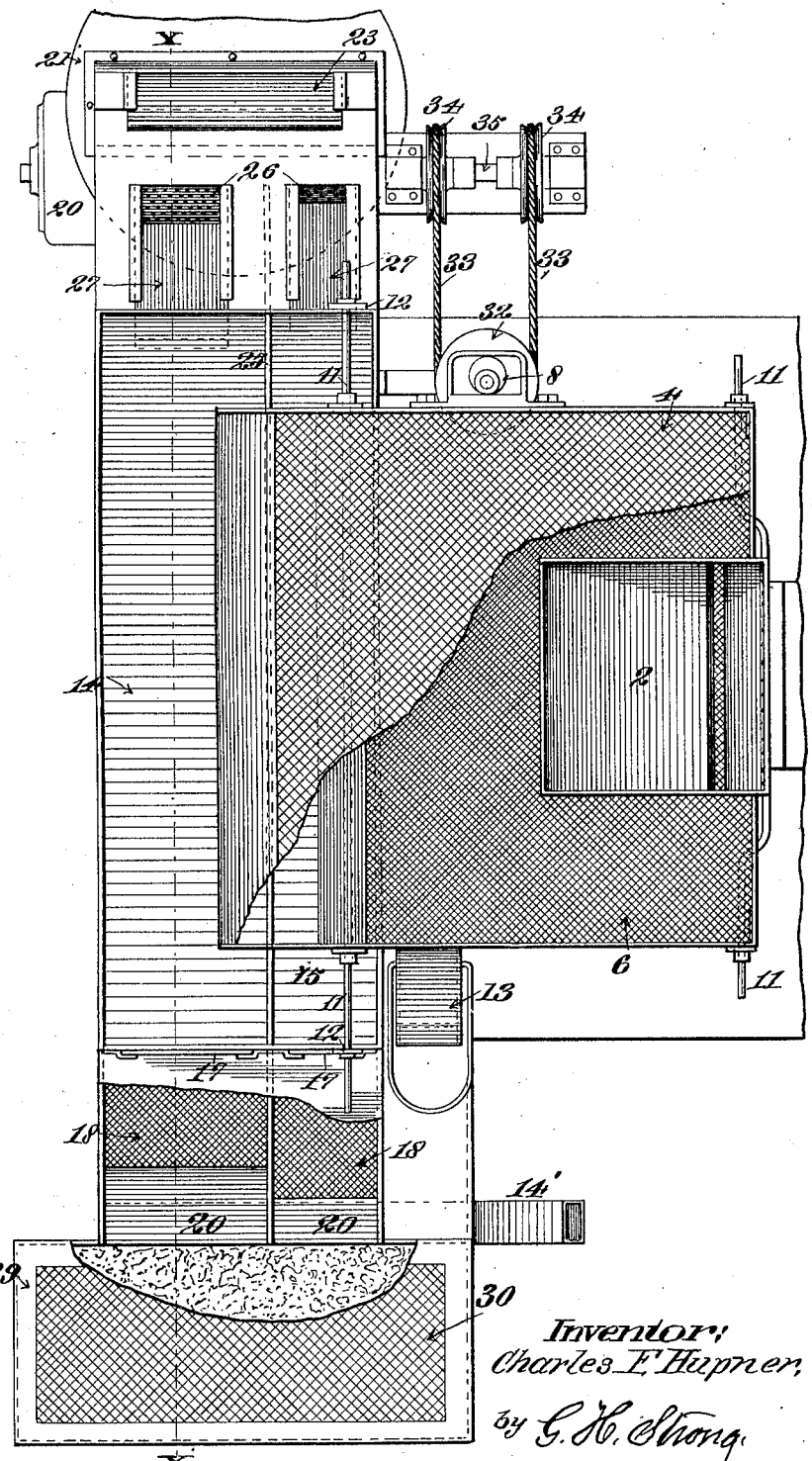

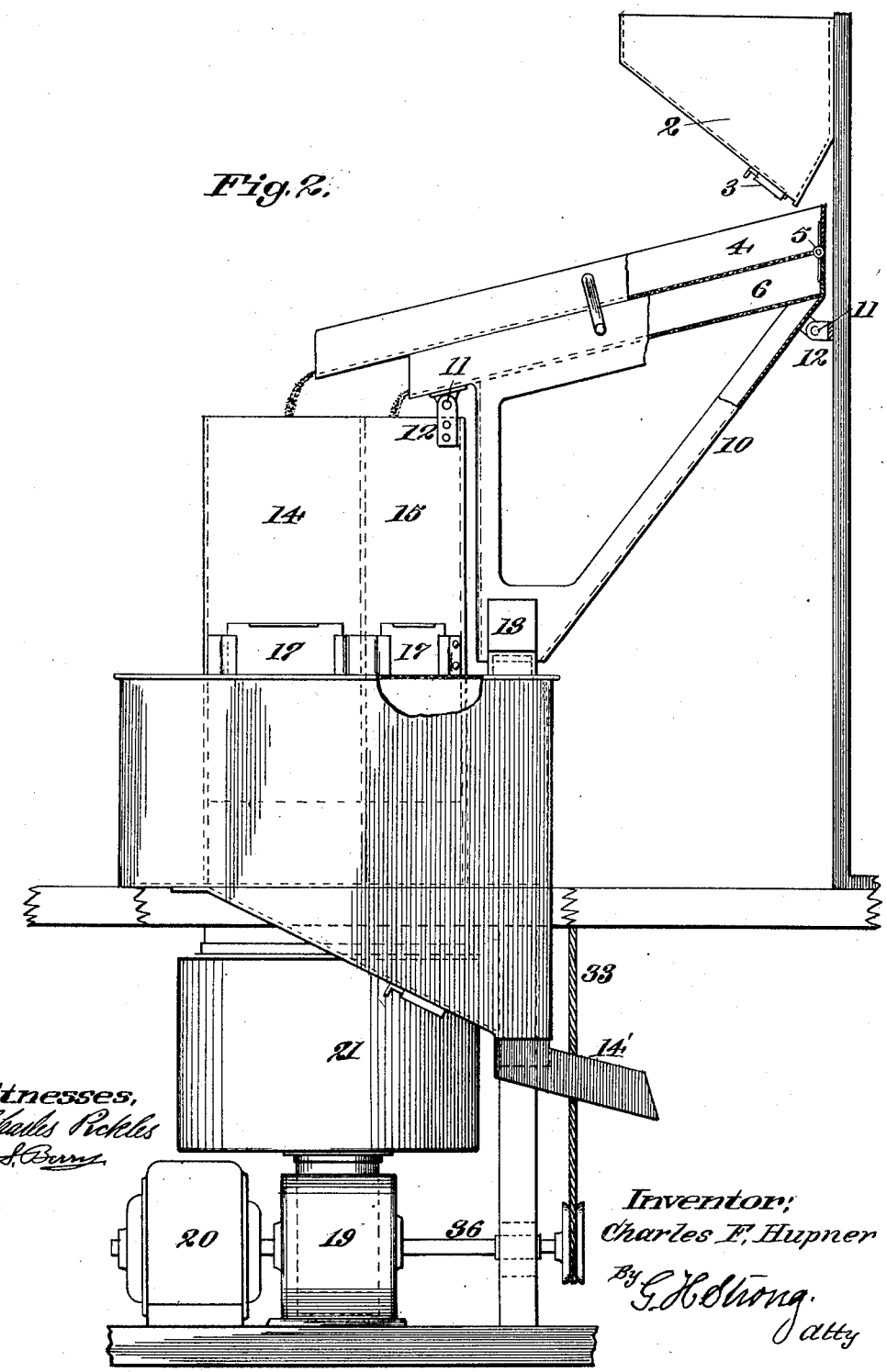

UNITED STATES PATENT OFFICE.

CHARLES F. HUPNER, OF SAN FRANCISCO, CALIFORNIA, ASSIGNOR OF ONE-HALF TO ELIZA T. WILSON, OF SAN FRANCISCO, CALIFORNIA.

CHAFF-SEPARATOR.

1,003,138. Specification of Letters Patent. Patented Sept. 12, 1911.

Application filed August 29, 1910. Serial No. 579,619.

*To all whom it may concern:*

Be it known that I, CHARLES F. HUPNER, a subject of the Emperor of Austria-Hungary, residing in the city and county of San Francisco and State of California, have invented new and useful Improvements in Chaff-Separators, of which the following is a specification.

This invention pertains to chaff separating machinery, and especially pertains to separators for the cleaning of coffee.

The object of this invention is to provide a small, efficient, reliable and simple apparatus for the separation of chaff from coffee, and the like; to provide an apparatus designed to separate rapidly and inexpensively the worthless chaff from the valuable material; and to divide and segregate the valuable material into grades of different fineness; and a particular object is to so devise a machine that the waste of valuable material is reduced to a minimum.

Heretofore, in the practice of separating chaff from its associated grain, kernel or bean it has been usual to attempt the separation of the chaff from the heavier valuable material by means of a current of air induced by suction. It has been found by actual experience that by this method as much as from six per cent. to twelve per cent. of the coffee is drawn away from the chaff by reason of the fact that the suction affects small particles of equal weight to the chaff as quickly as it does the particles of chaff. To obviate this, it has been the custom to first crack the coffee bean in large particles and then make a preliminary separation of the chaff from the grain; but even then there are found particles of coffee that are removed with the chaff, sometimes as much as two per cent. During this preliminary cracking of the coffee bean large particles of chaff are frequently still left clinging to the inner portion of the broken coffee bean, and this chaff is not separated from the bean. After this first preliminary separation the coffee is reground to produce the desired fineness, and then again subjected to the suction separation. It is at this point that the greater loss of valuable material occurs due to the incapacity of the suction draft to distinguish between a certain weight of chaff and of coffee, and which does not permit the fine coffee to settle back after once lifted.

Therefore, the object of this invention is to provide a machine which will give a more perfect separation of the chaff from the coffee, and which will reduce to a minimum the loss of valuable material.

The invention consists of the parts and the construction and combination of parts as hereinafter more fully described and claimed, having reference to the accompanying drawings, in which—

Figure 1 is a plan view of the machine in partial section. Fig. 2 is a front elevation of the same. Fig. 3 is a vertical longitudinal sectional view through the air separator chamber.

In the illustrated embodiment of my invention, I have shown a receiving hopper 2, of suitable size and form, provided at its bottom with a movable gate 3, and into which hopper coffee or other material which has been ground, is deposited and from which it is desired to remove the valueless chaff. By suitably adjusting the opening at the bottom of the hopper 2 by means of the gate 3 the contained material will gravitate downwardly upon an upper inclined rectangular screen 4, which is hinged at 5 above a lower parallel finer mesh screen 6. Each of these screens is adapted to be reciprocated horizontally by means of an eccentric 7, secured upon a vertical shaft 8, and running in an eccentric strap 9, which is fastened to one of the sides of a collector 10, upon which the superposed screens 4 and 6 are mounted. The collector 10 is slidably mounted upon horizontal rods 11, suitably secured in brackets 12, which are attached to the frame or body of the apparatus. Thus, when the shaft 8 is revolved the eccentric 9 reciprocates the collector 10, and its imposed screens horizontally, and the coarser material is collected on the upper screen 4, an intermediate grade is retained on the screen 6, and all fine coffee will pass through the screen 6 and be collected in or gathered in the collector 10, from which it is discharged through an inclined spout 13, and thence eventually through the discharge pipe 14'.

The fine material which passes through the lower screen 6 contains practically no chaff, and consists only of fine coffee or other valuable material. The coarse particles are gradually shaken downwardly over the inclined screen 4, and precipitated into a large chamber 14. The intermediate grade of material on the screen 6 is likewise discharged into a vertical chamber 15, adjacent chamber 14. Each of these chambers is provided with a common inclined bottom 16, down which the material slides and passes through suitable adjustable gates 17, and over appropriate screens 18. It is at this point, Fig. 3, that the separation of the chaff from the valuable material occurs, and I have found, by actual experience, by utilizing a forced draft or current of air, and applying it below the screens 18, that the force of the air will quickly and effectually separate the chaff and blow it upwardly away from the downwardly traveling heavier particles of valuable material.

By initially separating the coffee or other material into three distinct grades of fineness, the finest of which is not subjected to any air blast, and the other two grades of which are separately received and treated, I am enabled to produce a substantially chaffless product, and this with the loss of but a fractional per cent. of valuable coffee. This is because the two heavy grades of material being divided and segregated, the heaviest grade is subjected to an air blast of appropriate pressure, while the intermediate grade or that in chamber 15 is subjected to a lesser pressure of air blast. It is by this method that the economical and efficient separation of material takes places.

In order to properly control the pressure of air and its volume beneath the screens 18, and in order to supply air to the screens, I employ any suitable form of fan, as at 19, directly, or otherwise, connected to a suitable source of power, as a motor 20. The discharge from the fan 19 is delivered preferably into an equalizing reservoir 21 of suitable size, and from this reservoir the air passes through a suitable pipe 22, having interposed at some point, between the fan and the end of a flue 24, an adjustable valve or gate 23, so that the volume of air forced through the flue 24, at the end of which is located the screen 18, may be perfectly controlled. For instance, if the gate 23 is closed, then all of the air must pass through the flue 24, but if the gate 23 be opened a portion of the air will escape, thus reducing the quantity passing through the flue 24.

The flue 24 is preferably divided into two longitudinal compartments at a point beyond the gate 23, as by the partition wall 25, Figs. 1 and 3, and in order to further control the pressure and volume of air passing through each divisional chamber of the flue 24, there is mounted in each of these chambers curved, perforated deflectors 26, and immediately above each of these deflectors is mounted on top of the flue 24 independent gates 27, whereby a further portion of the air passing from the pipe 22 may be deflected before it enters the closed chambers in the flue 24. By means of these curved deflectors 26 and the slidable gate 27 the pressure of air in a division of the flue 24, for instance that division that delivers air to the screen 18 over which the heavy particles of coffee from the pocket 14 passes, is made greater than the pressure of air in the air flue delivering air to that portion of the screen over which the material from the pocket 15 passes. This difference in the pressures of the two portions of the flue 24 is thus effective independently against the heavy grade of coffee in the pockets 14, and the lighter grade in the pocket 15.

In operation, the air delivered from the fan 19 passes into a large equalizing reservoir 21 in which a certain predetermined pressure is generated and is controlled by the valve 23, thence passing through the pipe 22 the air will enter the flue 24, and pass along each side of the partition 25. In order to give a heavier pressure of air on one side than the other of the partition 25, the valves 27 are adjusted so that a larger amount of air may pass from one side of the partition than the other. After the air passes through the perforated deflector 26 on each side of the partition 25, it traverses the flue 24 and is forced through the screen 18, thus lifting the lighter worthless material, as chaff, from the downwardly traveling coffee, and blows the chaff sufficiently high to project it over and beyond an inclined apron 20, the heavier particles of valuable material passing below the plate 20, and dropping into the discharge spout 14'. In a similar manner the intermediate grade of coffee passing downwardly from the pocket 15 is also subjected to a lesser blast of air from its connected flue 24, and the chaff contained in this grade is also separated and blown over the plate 20, all of the chaff from both the pockets 14 and 15 being blown in a common receptacle or basket 29, which is covered, preferably, with a suitable screen 30 through which the air from the flue 24 may pass, but which prevents the escape of chaff from the apparatus.

The bottom of the chaff pocket 29 is provided with a suitable door or gate 31, whereby the chaff may be removed at required intervals.

Power is transmitted to the eccentric shaft 8 by means of suitable connections, as a pulley wheel 32 secured on said shaft, and a belt 33 traveling over a pulley 34 mounted on a suitable shaft 35, to which power may be transmitted from the shaft 36 of the fan.

Having thus described my invention, what I claim and desire to secure by Letters-Patent, is—

1. A separator comprising a plurality of screens, receivers for the material discharged by and through the screen, and means for subjecting the material to a segregating air blast, said means including a blast apparatus, an air flue leading into the presence of said material and means interposed in the flue between the inlet thereof and the material for diverting a portion of the blast outside the flue to thereby reduce the pressure in the flue.

2. A separator comprising a plurality of screens, receivers for the material discharged by and through said screens, means for subjecting certain of said material to a separating air blast, said means comprising a blast apparatus and a vertically divided flue leading therefrom into the presence of said material, and means for independently varying the pressure of air for the material, said last named means including an air deflector and separate valves at the inlet end of the flue for diverting a portion of the air outside the flue.

3. A separator and classifier comprising a plurality of superposed, inclined grading screens, mechanism for moving the screens, a receiver for collecting material passing through said screens, separate vertical chambers for receiving material not passing through the screens, inclined bottoms in said chambers whereby the separated grades of material are delivered to an inclined screen, gates controlling the movement of the material from the chambers to the screen, separate flues terminating beneath the screen and by which volumes of air may be discharged through the latter to separate the ingredients of the graded material.

4. A separator and classifier comprising a plurality of superposed inclined grading screens, mechanism for moving the screens, a receiver for collecting material passing through said screens, separate vertical chambers for receiving material not passing through the screens, inclined bottoms in said chambers whereby the separated grades of material are delivered to an inclined screen, gates controlling the movement of the material from the chambers to the screen, separate flues terminating beneath the screen and by which volumes of air may be discharged through the latter to separate the ingredients of the graded material, a blower common to the flues by which the air is impelled therethrough, and adjustable dampers at each end of the flues by which the pressure of air delivered against the screen may be regulated.

5. A chaff separator comprising a plurality of reciprocatory screens of different mesh, receiving pockets into which said screens may deliver the material from their surfaces, separator plates over which the material is adapted to pass after leaving said screens, means whereby blasts of air of unequal pressure may be projected through said plates to separate the chaff from the grain, said means including a flue divided into independent compartments, curved perforated deflectors in each of said compartments, and dampers located above said deflectors a pressure blower.

6. A chaff separator comprising pockets having inclined bottoms, gates controlling the discharge from the pockets, a flue connected to the lower end of the pockets and adjacent said gates, screen plates covering the mouth of said flue over which the material from each of the pockets may travel, a dividing wall in said flue forming independent chambers, a perforated deflector plate located in each of said chambers, dampers located in the walls of the flue adjacent the deflector plates, and means whereby a volume of air of suitable pressure may be discharged against the deflectors, said means said deflectors, a pressure blower.

7. In a separating apparatus, superposed parallel inclined screens of different mesh, the upper screens adapted to catch coarse grades, and the lower screen adapted to catch intermediate grades, a collector below said screens for receiving the fine material, independent pockets adapted to receive the material from the coarse screen and from the intermediate screen, pockets having inclined bottoms, gates controlling the discharge from said pockets, a flue, a screen plate covering the mouth of said flue, and connected to the inclined bottom of the pockets, means for supplying air blasts of unequal pressure against the material traveling over said screen plate, and a receptacle for the cleaned material and for the chaff.

In testimony whereof I have hereunto set my hand in the presence of two subscribing witnesses.

CHARLES F. HUPNER.

Witnesses:
CHARLES W. WILSON,
F. E. MAYNARD.

Copies of this patent may be obtained for five cents each, by addressing the "Commissioner of Patents, Washington, D. C."